United States Patent [19]

Gerstley

[11] 4,323,858

[45] Apr. 6, 1982

[54] FOIL COOLING SYSTEM FOR HIGH CURRENT DENSITY ELECTRON-BEAM PUMPED LASERS

[75] Inventor: James G. Gerstley, Sherman Oaks, Calif.

[73] Assignee: Rockwell International Corporation, El Segundo, Calif.

[21] Appl. No.: 115,478

[22] Filed: Jan. 25, 1980

[51] Int. Cl.³ .............................................. H01S 3/02
[52] U.S. Cl. ....................................... 372/107; 372/35
[58] Field of Search .................. 331/94.5 PE, 94.5 G, 331/94.5 D

[56] References Cited

U.S. PATENT DOCUMENTS 3,789,321  1/1974  Krawetz et al. .............. 331/94.5 PE
3,972,009  7/1976  Duchet ......................... 331/94.5 PE

*Primary Examiner*—William L. Sikes
*Attorney, Agent, or Firm*—H. F. Hamann; Harry B. Field

[57] ABSTRACT

A laser of the type in which laser gas molecules are pumped by an electron beam has a gas-cooled window forming the interface between the electron beam source and the laser gas. The window includes a metallic foil mounted on a supporting frame with a parallel thin layer of material transparent to the electron beam positioned between the foil and the electron beam source. Helium or other cooling fluid is circulated in the space between the foil and the intermediate layer for conducting heat away from the foil. The helium may be at an intermediate pressure less than the pressure of the laser gas on one side of the foil but greater than the vacuum of the electron beam source to reduce foil stresses.

12 Claims, 4 Drawing Figures

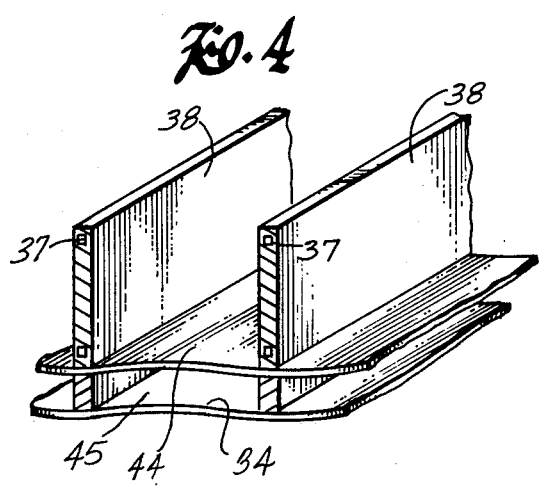

FOIL COOLING SYSTEM FOR HIGH CURRENT DENSITY ELECTRON-BEAM PUMPED LASERS

FIELD OF THE INVENTION

This invention relates to electron-beam lasers, and more particularly, to a system for cooling the window through which the electron beam enters the region of the laser gas molecules.

BACKGROUND OF THE INVENTION

Lasers using high current density electron beams for pumping the laser are well known. For example, a class of lasers best known as "excimer" laser systems have been developed in which rare gas halides form the working fluid and the lasing action in the fluid is pumped by an electron beam. Gas molecules, such as krypton fluoride or xenon fluoride, for example, have been used as the work fluid. The scaling up of such electron beam pumped lasers to produce high average powers has been limited by electron energy loss and subsequent heating of the electron beam window through which the electron beam passes from the high vacuum source into the region of the laser gas in the laser cavity. It has been the practice to make such windows of a thin metallic foil. To prevent an undue energy loss, the foil must be made as thin as possible while at the same time providing sufficient mechanical strength to withstand the pressure differential between the pressurized working fluid in the laser chamber, which may be of the order of 100 psi and the high vacuum of the electron beam source. Because the foil is very thin, conduction of heat generated in the foil by the electron beam to the supporting structure is not adequate to prevent temperature buildup. Attempts have been made to use the working fluid as a convection cooling medium for the foil, but this is not practical in all instances.

SUMMARY OF THE INVENTION

The present invention is directed to an improved cooling arrangement for the electron beam window of a laser pumped by a high current density electron beam. The window permits operation at higher average power levels by providing high efficiency transfer of the electron beam while maintaining an effective molecular barrier between the vacuum of the beam source and the laser gas medium. This is accomplished, in brief, by providing a window in which a metallic foil separates the electron beam source from the gas medium. In addition, a second foil spaced from the metallic foil is positioned between the metallic foil and the source of the electron beam. This second foil is made of a material transparent to the electron beam. A cooling fluid, such as helium gas, is circulated in the space between the metal foil and the second foil at an intermediate pressure so that the pressure drop across the metallic foil is substantially reduced, thus permitting a thinner foil which absorbs less energy from the electron beam to be used.

DESCRIPTION OF THE DRAWINGS

For a better understanding of the invention reference should be made to the accompanying drawings, wherein:

FIG. 4 is an enlarged perspective view showing details of the window construction of the present invention.

DETAILED DESCRIPTION

Figure 1:
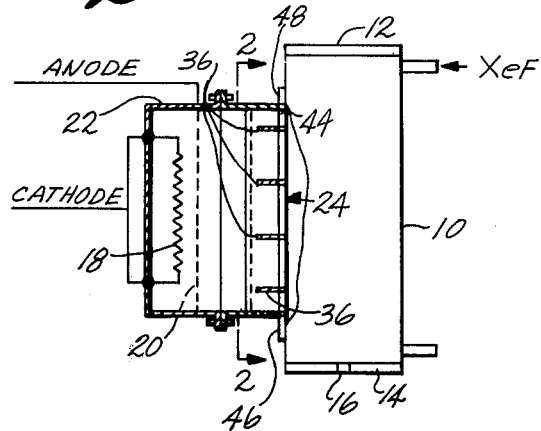
FIG. 1 is a diagramatic showing of an excimer laser incorporating the present invention.

Referring to FIG. 1 there is shown an excimer laser including a laser cavity 10 containing a working fluid such as xenon fluoride (XeF) typically at a pressure of six or seven atmospheres. Mirrors 12 and 16 at either end of the laser cavity 10 produce multiple reflections of the light energy produced by the lasing action in the cavity. The laser beam is directed out of the cavity through the area shown as 14. Pumping action of the laser is produced by an electron beam generated by a suitable source including a cathode 18 and anode 20 within a high-vacuum chamber 22 along the side of the laser cavity. The chamber 22 is sealed and pumped to a high vacuum. The high-energy electron beam enters the laser cavity 10 through a window 24 at the interface between the vacuum chamber 22 and the laser cavity 10.

Figure 2:
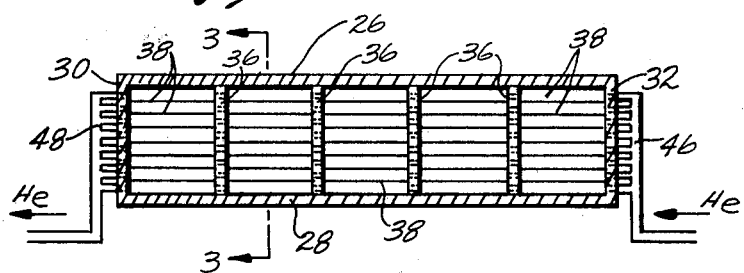
FIG. 2 is a sectional view taken substantially on the line 2—2 of FIG. 1.
Figure 3:
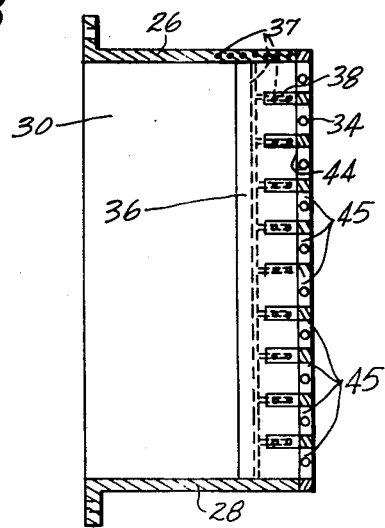
FIG. 3 is a sectional view taken substantially on the line 3—3 of FIG. 2.

As best seen in FIGS. 2, 3, and 4, the window 24 is constructed of an open rectangular frame including a top wall 26, bottom wall 28, and two side walls 30 and 32. The frame forms part of the vacuum chamber 22 and is mounted on the side of the laser cavity 10. A metallic foil 34 extends across one end of the rectangular frame of the window assembly and forms the interface between the vacuum chamber and the laser chamber. The metallic foil 34 is preferably made of titanium or other conductive material having a very high tensile strength even at elevated temperatures. The metallic foil is typically of a thickness of the order of 0.002 inches.

The metallic foil is supported within the frame of the window by an open grid structure within the rectangular frame including a plurality of equally spaced vertical members 36 secured at either end to the top and bottom walls 26 and 28 of the window assembly frame. In addition, a plurality of thin horizontal louvers 38 bridge the spaces between the vertical members 36. If desired, the outer frame and grid work of the window structure can be formed with internal passages as indicated at 37 for circulating water or other suitable cooling fluid through the structure to help conduct heat away from the foil supporting structure.

As thus far described, the laser is of typical construction for an excimer laser. The metallic foil is necessary to form the wall of the laser chamber even though metal is not very transparent to electrons unless made very thin. Thus the metallic foil does absorb enough energy from the electron beam to become heated to relatively high temperatures.

The present invention provides a means of making the foil 34 thinner, reducing the amount of energy absorbed, and also providing convection cooling of the foil. This is accomplished by provision of a film 44 which is parallel to the metallic foil 34 but spaced therefrom in the direction toward the electron beam source. This inner film 44 is preferably made of a plastic layer or sheet, such as Kapton, which is transparent to the electron beam and therefore absorbs very little energy. As best seen in FIG. 4, the metallic foil 34 and inner plastic film or sheet 44 combine with the horizontal frame members 38 to form passages 45 through which a coolant fluid such as helium gas may be circulated by suitable manifolds 46 and 48 at either end of the window assembly. The manifolds communicate with the passages 45 through openings in the end walls 30 and 32 of the window frame. The coolant fluid is maintained at a pressure intermediate the high vacuum of the electron beam source and the much higher pressure of the working fluid of the laser cavity 10. For example, the helium coolant gas may be maintained at a pressure of three atmospheres. By providing a smaller incremental pressure drop across each of the two foils, the foil material can be made substantially thinner without danger of rupturing. At the same time the circulation of the coolant gas reduces the temperature buildup in the metallic foil by the absorption of energy from the electron beam. While plastic material is preferred for use in the inner film 44, a thin metallic foil, such as aluminum, could be used. While this would result in higher energy absorption from the electron beam, the circulation of coolant between the two foils would limit excessive temperature buildup.

It is to be understood that what has been described is merely illustrative of the principles of the invention and that numerous arrangements in accordance with this invention may be devised by one skilled in the art without departing from the spirit and scope thereof.

What is claimed is:

1. A window for transmitting an electron beam from a source contained within a high vacuum chamber into a gaseous region, said window comprising:
   an aperature communicating said high vacuum chamber with said gaseous region;
   a metallic foil covering said aperture and isolating said gaseous region from said high vacuum chamber;
   a thin film of material transparent to the electron beam positioned between the foil and the electron beam source so that the electron beam passing from the source must pass through the film and through the foil to the gaseous region;
   support means securing the foil and film in spaced gas-tight relationship; and
   a cooling fluid in the space between the foil and the film.

2. Apparatus of claim 1 wherein the pressure of the cooling fluid is intermediate the pressure of the gaseous region and the high vacuum of the source.

3. Apparatus of claim 1 further including means for circulating the cooling fluid through the space between the foil and the film.

4. Apparatus of claim 1 wherein said support means includes a framework having fluid passages in the framework for circulating a coolant.

5. Apparatus of claim 1 wherein the cooling fluid is helium.

6. Apparatus of claim 1 wherein the foil is titanium.

7. Apparatus of claim 1 wherein the film is plastic material.

8. In a laser including:
   means forming an elongated laser cavity containing a lasing gas under pressure, an evacuated electron beam source mounted adjacent to the laser cavity, and window means positioned between the source and the cavity admitting the electron beam from the source into the cavity for pumping the lasing gas while blocking the transfer of gas out of the cavity into said source, the improvement wherein the window means includes an outer frame forming an opening between the source and the cavity, a pair of spaced parallel foils spanning the opening and secured at their edges to the frame; and
   means passing cooling fluid between the two foils.

9. Apparatus of claim 8 wherein the foil adjacent the laser cavity is metallic.

10. Apparatus of claim 10 wherein the foil adjacent the beam source is non-metallic.

11. Apparatus of claim 8 further including a grid structure extending between the two foils to support the foils in spaced relationship.

12. Apparatus of claim 11 wherein the pressure of the cooling fluid between the foils is an intermediate level between the vacuum of the beam source and the pressure of the laser gas in the cavity.

* * * * *